(12) United States Patent     (10) Patent No.: US 7,110,798 B2
Nassimi     (45) Date of Patent: Sep. 19, 2006

(54) WIRELESS HEADSET

(76) Inventor: Shary Nassimi, 2002 NW. 215 Cir., Ridgefield, WA (US) 98642

( * ) Notice: Subject to any disclaimer, the term of this patent is extended or adjusted under 35 U.S.C. 154(b) by 467 days.

(21) Appl. No.: 10/143,136

(22) Filed: May 9, 2002

(65) Prior Publication Data

US 2003/0211871 A1     Nov. 13, 2003

(51) Int. Cl.
*H04M 1/00* (2006.01)
(52) U.S. Cl. .............................. 455/575.2; 455/569.1; 455/573; 455/90.2
(58) Field of Classification Search ............ 455/550.1, 455/569.1, 569.2, 572, 573, 575.1, 575.2, 455/575.7
See application file for complete search history.

(56) References Cited

U.S. PATENT DOCUMENTS

| | | | |
|---|---|---|---|
| 5,590,417 A * | 12/1996 | Rydbeck ................... | 455/575.2 |
| 6,230,029 B1 * | 5/2001 | Hahn et al. ............... | 455/575.2 |
| 6,373,437 B1 * | 4/2002 | Morningstar ................ | 343/702 |
| 6,459,882 B1 * | 10/2002 | Palermo et al. ............ | 455/41.1 |
| 2002/0016188 A1 * | 2/2002 | Kashiwamura ............. | 455/568 |

* cited by examiner

*Primary Examiner*—Temica Beamer

(74) *Attorney, Agent, or Firm*—George R. McGuire; Bond, Schoeneck & King, PLLC

(57) ABSTRACT

The present invention teaches a hands free headset of small size. With the headset is a base transceiver unit which connects to the cell phone or other device having audio input and output. The base transceiver unit may advantageously contain a rechargeable battery to allow for mobile operation, the headset transceiver unit may also use a small rechargeable battery ("coin size") for reduced size and easy recharging. The base transceiver unit may communicate with the headset via half or full duplex transmission and reception. This may also be achieved in alternative embodiments by digitally encoding one or both of the signals and transmitting them as digital data. The antenna of the headset unit may be located on or within the microphone tube, thus allowing a reduced headset size. The base transceiver unit, which may be plugged into electrical power wiring continuously or may be completely mobile may also save energy in the form of electricity by avoiding an unnecessary "trickle current". The battery in the base transceiver unit, and the battery in the headset, may both be inductively recharged in the present invention. Another space, weight and cost saving feature of the present invention is the ability to automatically control volume. Automatic volume control allows elimination of external volume control structure yet still allows volume control to occur. In the present invention, volume is controlled by the base device attached to the base transceiver unit. By this means, battery life may be extended yet without the cost and bulk of an external control device such as a switch of a size suitable for a user's fingers to operate.

14 Claims, 4 Drawing Sheets

WIRELESS HEADSET

FIELD OF THE INVENTION

This invention relates to generally to wireless headsets and specifically to "hands free" full duplex wireless headsets for cell phones and other devices with audio input and output.

REFERENCE TO DISCLOSURE DOCUMENT

The present invention is the same device taught in USPTO Disclosure Document 506207, dated Feb. 21, 2002 and date stamped by the OIPE Feb. 26, 2002, to the same inventor, Shary Nassimi, and entitled "Hands Free Wireless Headset for Cell Phones".

BACKGROUND OF THE INVENTION

Cellular telephones, while convenient, require the user to use one hand to hold the telephone in proximity to ear and mouth in order to use the telephone. In addition, when the user wishes to use a cell phone control such as the alphanumeric keypad, the user must take the cell phone from their ear and transfer it to a location in which they can see the keypad and push buttons as needed. In addition to inconvenience and distraction from contraindicated activities such as driving, this is a two handed process. These problems are not restricted to cellular telephones as a growing number of types of devices offer users audio input and output data. Personal computers and personal digital assistants, as two examples, offer increasingly efficient speech recognition. Digital and tape recorders, which do not offer voice recognition, are also examples of the types of devices which may increasingly be voice activated and may even offer preprogrammed voice output.

The requirement of holding a device such as a cell telephone to the ear in turn causes various other problems, safe operation of motor vehicles being one major example of such issues, tiredness by the user's arm being a less important type of problem. For these reasons and others, vendors and inventors are offering a range of solutions to the problem of "hands free" cell phone operation.

One attempt to solve this problem is the "hands free cell phone" in which the volume of the audio output and the sensitivity of the audio input are dramatically increased. The user places the cell phone or other device in a special holder or merely places it on seat or dashboard and speaks loudly. Such systems have numerous disadvantages: audio feedback, ambient interference and poor sound quality, among others. Lack of privacy is increasingly an issue as well, since both sides of the conversation are clearly audible to anyone nearby.

One more promising route for improvement is the use of the headset. By wearing earphones and a microphone, a user can escape the need to continuously hold the cellular telephone or other audio input/output device. Unfortunately, headset cords connecting the headset to the base device can entangle the user's hands, arms, or whatever they may be using, such as a computer keyboard or steering wheel, thus posing a threat on their own. The solution to this problem is the wireless headset, in which the headset device and base device communicate by means of RF transmissions.

Wireless headsets offer a potentially life saving hands free mode of operation for motor vehicles and other activities which require continuous active use of two hands. The user wears the wireless headset with microphone and speakers, leaves the base unit safely tucked away, and is in no danger of having one or more hands entangled in a cord or used to control the base device. This life saving ability is of increasing importance as the number of cell telephones on the road proliferates and drivers increasingly ignore safety (and in some jurisdictions the law) in order to use their telephone, computer, recorder or other device. Other situations than driving may also show the life saving features of the present invention: skiing, bicycling, operation of industrial machinery, printing presses, civil engineering equipment, etc.

And in yet a broader range of applications, the device of the present invention may be used to provide convenience and increase productivity: secretarial work, telemarketing, office work, etc.

Various wireless headsets schemes have been proposed. In general, the problem with most headsets is size, bulk, and lack of ease of use. The following prior art head sets show these disadvantages.

U.S. Pat. No. 4,882,745 issued Nov. 21, 1989 to Silver for "CORDLESS HEADSET TELEPHONE" shows one early telephone headset in the context of a conventional land-line telephone. The headset disclosed has a large ear piece, telescoping antennas in both base unit and headset, and a cross section so large as to include a keypad on the headset portion of the device. The '745 patent teaches only that charging of the headset battery is accomplished by means of contacts 29 seen in FIG. 2 and FIG. 5. The headset also includes on/off switches and a manual volume control.

U.S. Pat. No. 5,590,417 issued Dec. 31, 1996 to Rydbeck for "RADIOTELEPHONE APPARATUS INCLUDING A WIRELESS HEADSET" teaches a headset in which recharging is accomplished when the headset is attached to the base transceiver unit. The gain control of the headset is accomplished manually by means of controls in the base transceiver unit, as discussed in column 4 at lines 38 through 59. Two embodiments are taught in both of which manual control of headset output volume is accomplished manually at the base transceiver unit.

U.S. Pat. No. 6,078,825 issued Jun. 20, 2000 to Hahn et al. for "MODULAR WIRELESS HEADSET SYSTEM FOR HANDS FREE TALKING" and U.S. Pat. No. 6,230,029 B1 issued May 8, 2001 to Hahn et al. for "MODULAR WIRELESS HEADSET SYSTEM" disclose a headset having battery contacts used to charge the removable battery pack module. These patents also teach that the headset have manual on/off, channel and volume controls.

Finally, US Patent Application Publication No. US 2001/0016506 A1 published Aug. 23, 2001 in the name of Son et al. and entitled "WIRELESS HANDS-FREE SYSTEM OF CELLULAR PHONE" teaches a battery operated hands free headset having a battery saving feature described in paragraph 0014. No indication of any means of charging of the battery is present in the publication, and as specified in the final phrase of paragraph 0013, a switch on the headset is operated by the user.

These devices all require either changing of the batteries or plugging the batteries into some type of charger arrangement having contacts, springs, sockets or other devices. In addition, the structure which allows changing of the batteries or charging of them (the contacts, sockets, access panels, etc) all add cost, weight and complexity to the headsets. However, the objective of having such headsets is simplicity, small size, light weight, and ease of use.

In addition, the size and weight of these headset devices is increased by the use of various ancillary devices such as on/off switches, volume controls, etc, the functions of these device can be better handled by means of different and smaller structures.

Finally, none of the devices disclosed teach a method by which the "trickle current" which the base transceiver unit uses may be turned on and off. None of these devices teach that the "trickle current" powering the wireless device may be turned off when not in use, yet leave the base device (such as a telephone) turned on, and further have the wireless device be available for use whenever the base device is used. Such "trickle currents" in consumer electronic devices such as VCRs, televisions, computers, caller ID boxes, and so on are now known to be a cumulatively large source of energy wastage in the form of electricity generated and supplied to homes and businesses and wasted to power LCDs and other circuitry in such consumer devices while the devices are not in use.

SUMMARY OF THE INVENTION

General Summary

The present invention teaches a hands free headset of small size which is more easily used than previous designs.

With the headset is a base transceiver unit which connects to the cell phone or other device having audio input and output. The base transceiver unit may be attached to a cell phone by a variety of structures such as a 2.5 mm jack; such jacks already exist on various types of cellular telephones. The base transceiver unit may advantageously contain a rechargeable battery to allow for mobile operation, the headset transceiver unit may also use a small rechargeable battery ("coin size") for reduced size and easy recharging. Various types of rechargeable batteries may also be used (Li-ion, Ni-Cad, etc) in the present invention. The base transceiver unit communicates with the headset via half or full duplex transmission and reception, allowing continuous audio input and output as needed. This may also be achieved in alternative embodiments by digitally encoding one or both of the signals and transmitting them as digital data.

Advantageously, high frequencies may be utilized by the invention in order to provide greater antenna efficiency and clarity of sound. The antenna of the headset unit may be located on or within the microphone tube, thus allowing a reduced headset size.

The base transceiver unit, which may be plugged into electrical power wiring continuously or may be completely mobile may also save energy in the form of electricity by avoiding an unnecessary "trickle current".

One space, weight and cost saving feature of the present invention is the ability to recharge the battery without having any form of contacts, sockets or other external recharging interface. The battery in the base transceiver unit, and the battery in the headset, are both inductively recharged in the present invention. Thus, the present invention is also more convenient than prior art headset devices as it does not require the operator to "plug it into" the base transceiver unit for recharging. In fact, even the base transceiver unit need not be plugged in, as it may also be recharged inductively. The present invention further allows the batteries to be recharged, wirelessly, when the headset unit is in use within the operative recharging distance of the base unit. This ease of recharging in turn allows reduction of battery capacity and thus battery size, leading to further reductions in space, weight and cost.

Another space, weight and cost saving feature of the present invention is the ability to automatically control volume. Automatic volume control allows elimination of external volume control structure yet still allows volume control to occur. In the present invention, volume is controlled by the base device attached to the base transceiver unit.

SUMMARY IN REFERENCE TO CLAIMS

The present invention teaches a wireless headset comprising: a clip dimensioned and configured to hold the wireless headset properly oriented near the ear and mouth of a user; a microphone operatively connected to a radio frequency transmitter; a speaker operatively connected to a radio frequency receiver; a rechargeable battery; and a first inductive coil operatively connected to the battery; whereby when a current is induced in the inductive coil, the inductive coil recharges the battery.

It is one objective and advantage of the present invention to teach a wireless headset further comprising: a power control device capable of controlling current flow to at least one member of the group comprising: the transmitter, the receiver, the speaker, the microphone, and combinations thereof, wherein; the power control device has no manual control.

It is one objective and advantage of the present invention to teach a wireless headset further comprising: a body portion within which the transmitter and receiver are contained.

It is one objective and aspect of the present invention to teach a wireless headset wherein the transmitter uses a radio frequency in the range from 100 MHz to 2.4 GHZ.

It is one objective and embodiment of the present invention to teach a wireless headset further comprising an antenna, and a microphone tube, wherein the microphone is contained within the microphone tube.

It is one embodiment, objective and advantage of the present invention to teach a wireless headset comprising: a clip dimensioned and configured to hold the wireless headset properly oriented near the ear and mouth of a user; a microphone operatively connected to a radio frequency transmitter; a speaker operatively connected to a radio frequency receiver; a battery; at least one antenna operatively connected to one member selected from the group comprising: the transmitter, the receiver, both the transmitter and receiver; and a microphone tube having first and second ends, the microphone tube dimensioned and configured such that when the wireless headset is properly oriented near the ear and mouth of the user, the first end of the microphone tube is located near the mouth of the user; wherein the at least one antenna runs along the microphone tube.

It is one objective and advantage of the present invention to teach a wireless headset further comprising: a power control device capable of controlling current flow to at least one member of the group comprising: the transmitter, the receiver, the speaker, the microphone, and combinations thereof, wherein; the power control device has no manual control.

It is one objective and advantage of the present invention to teach a wireless headset further comprising: a body portion within which the transmitter and receiver are contained.

It is one objective and advantage of the present invention to teach a wireless headset wherein the transmitter uses a radio frequency in the range from 100 MHz to 2.4 GHz.

It is one objective and advantage of the present invention to teach a wireless headset further comprising: a first inductive coil operatively connected to the battery; whereby when a current is induced in the inductive coil, the inductive coil recharges the battery.

It is one embodiment, objective and advantage of the present invention to teach a base transceiver for a wireless headset, the base transceiver comprising: a microphone operatively connected to a radio frequency transmitter; a speaker operatively connected to a radio frequency receiver; a rechargeable battery; and a first inductive coil operatively connected to the battery; whereby when a current is induced in the inductive coil, the inductive coil recharges the battery.

It is one objective and advantage of the present invention to teach a base transceiver further comprising: a power control device capable of controlling current flow to at least one member of the group comprising: the transmitter, the receiver, the speaker, the microphone, and combinations thereof, wherein; the power control device has no manual control.

It is one objective and advantage of the present invention to teach a base transceiver further comprising: a body portion within which the transmitter and receiver are contained.

It is one objective and advantage of the present invention to teach a base transceiver of claim 10, wherein the transmitter uses a radio frequency in the range from 100 MHz to 2.4 GHZ.

It is one objective and advantage of the present invention to teach a base transceiver further comprising: at least one antenna.

It is one objective and advantage of the present invention to teach a base transceiver further comprising: a plug and power reception circuitry, the plug dimensioned and configured to receive electrical energy from an electrical outlet.

It is one objective and advantage of the present invention to teach a base transceiver of further comprising: digital encoding/decoding circuitry, wherein radio transmitter and the radio frequency receiver use digitally encoded data.

It is one objective and advantage of the present invention to teach a base transceiver wherein the radio transmitter and radio receiver provide half duplex data transmission.

It is one objective and advantage of the present invention to teach a base transceiver wherein the radio transmitter and radio receiver provide full duplex data transmission.

DETAILED DESCRIPTION

Figure 1:
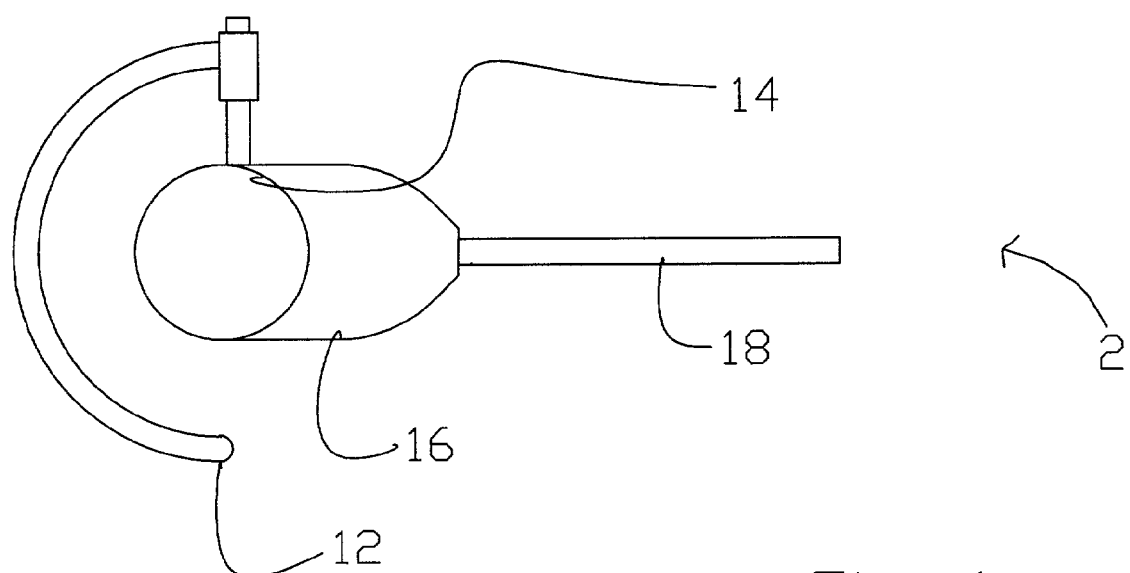
FIG. 1 is a side view of the first embodiment of the improved wireless headset of the invention.

FIG. 1 is a side view of the first embodiment of the improved wireless headset of the invention. Headset 2 has ear clip 12 used to retain headset 2 on an ear. Earpiece speaker 14 fits in or over the user's ear. Body 16 contains the electronic devices used to make the headset device work properly, while microphone tube 18 may contain a microphone (not shown). The microphone may be located at the base of microphone tube 18 inside or near to body 16, or in alternative embodiments the microphone may be located at other locations in or on microphone tube 18. While clip 12 is the preferred embodiment and best mode presently contemplated for holding the headset to the user's ear and properly oriented near the user's ear and mouth, other structure such as elastic bands, hair clips, head bands, etc, may be substituted without departing from the scope of the invention. Microphone tube 18 has two ends, one located at body 16, the other located such that when the headset is worn properly, one end of microphone tube 18 is located near the user's mouth.

Microphone tube 18 may also advantageously contain one or more antennae. This allows increased length for each antenna and yet does not increase the overall length of headset 2.

Figure 2:
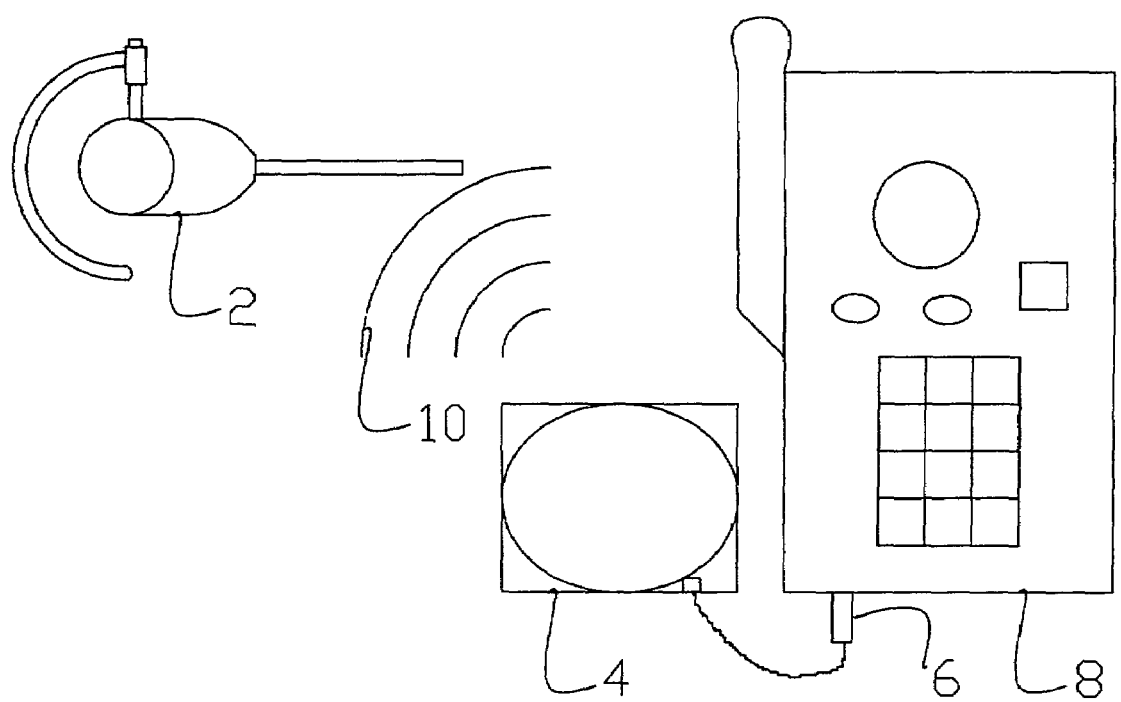
FIG. 2 is a block diagram of a second embodiment of the invention, showing the overall system in use with a cell phone.

FIG. 2 is a block diagram of a second embodiment of the invention, showing the overall system in use with a cell phone. Headset 2 communicates via 2-way RF link with base transceiver 4. Base transceiver 4 in turn has connections 6 to base unit 8. In the second embodiment, base unit 8 may be a cell phone (as shown in FIG. 2) or may be another type of device. Such devices now include computers (which are increasingly able to input, process, and output, human speech), personal digital assistants, recorders, other consumer electronic devices, and in the future, a wide range of other devices which are not presently known (real-time verbal translators) or which are presently known but which are not presently susceptible to reliable audio input and output (automobiles for handicapped mobility). Such devices, now known or later developed, are included within the possible types of base units useful with the present invention.

Both headset 2 and base transceiver 4 may be recharged inductively, as will be disclosed below. In the second embodiment, headset 2 may be either headset 2 as taught by the first embodiment or an equivalent headset as claimed herein.

Figure 3:
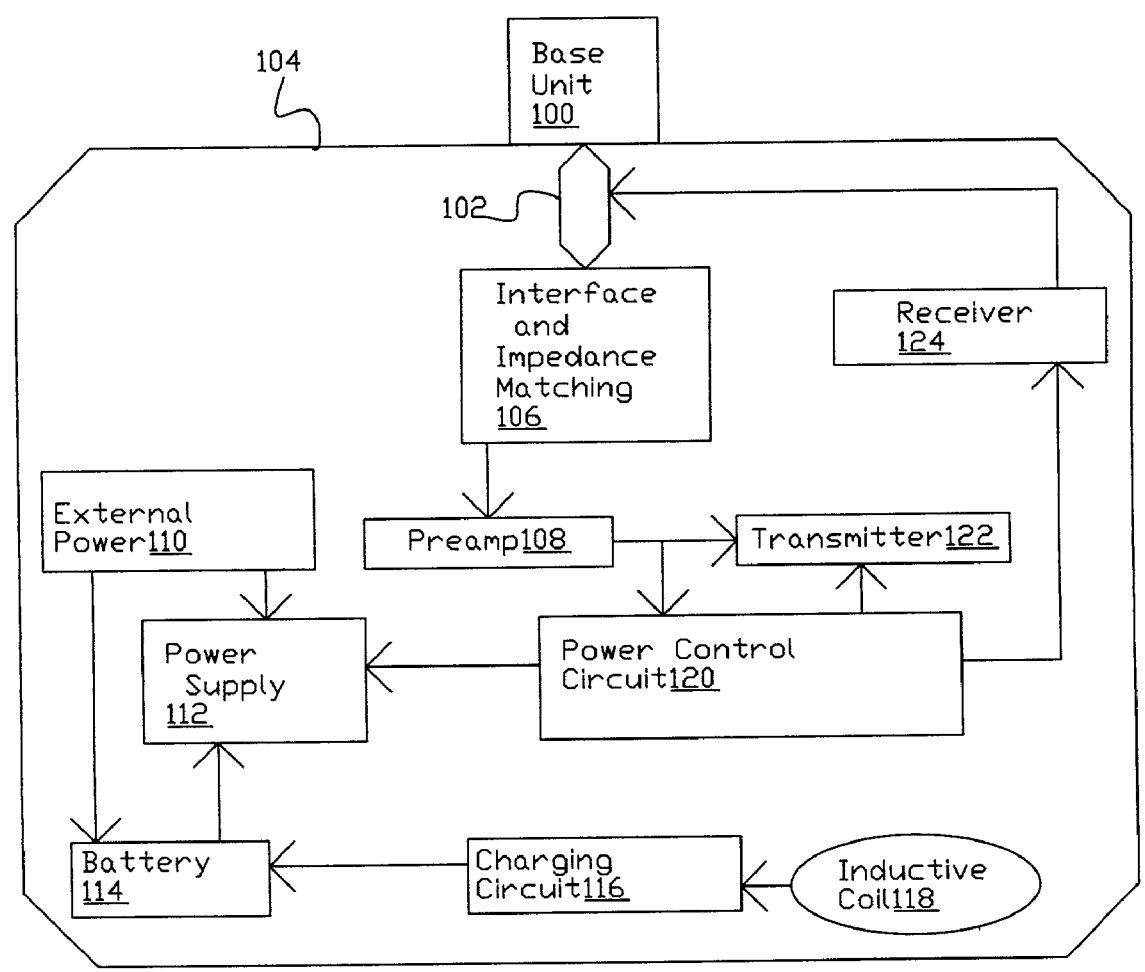
FIG. 3 is a block diagram of a third embodiment of the invention showing details of the base transceiver unit.

FIG. 3 is a block diagram of a third embodiment of the invention showing details of the base transceiver unit. Base unit 100 connects via connection 102 to base transceiver unit 104. Base unit 100 may be any of the devices as discussed previously. Connection 102 may be a cable and 2.5 mm jack, another form of standard jack such as is used in the telecommunication industry (for example, RJ-11), or another form of standard jack such as is used in the computer industry (IEEE 1394, USB, etc) or another type of jack. The connection may also be made without a cable/jack structure, for example, base transceiver unit 104 may be integrated into base unit 100, or a non-physical connection may be established, etc.

Interface 106 performs matching of impedance (resistance), protocols, and/or physical matching to the connection means, then sends the signals to be sent to a headset unit (not shown) to preamp 108. After the signal is boosted, filtered, transformed and otherwise handled in preamp 108, transmitter 122 sends an RF signal. An antenna (not shown) may advantageously be used with transmitter 122. Transmitter 122 may use any frequency legally available, for example, in the US, the Federal Communications Commission establishes and regulates use of such frequencies. RF signal 122 may advantageously be a high frequency signal allowing greater bandwidth and thus an increased audio data capacity and greater clarity, broader audio frequency range transmission, etc. RF signal 122 may be full or half duplex, or may be digitally encoded by any method (TDMP, etc).

Receiver 124 sends RF data in the other direction, receiving it from the headset transceiver unit and sending it to the base unit 100. In the embodiment shown, receiver 124 sends the RF data to connection 102, however, receiver 124 may in other alternative embodiments operate through other circuitry such as interface 106 or analogous devices.

Receiver 124 and transmitter 122 may operate independently, may operate in full-duplex mode, etc, thus allowing simultaneous transmission and reception.

External power 110 may be a conventional AC power source at the locally used voltage and frequency (for example 115 VAC@ 60 Hz), or it may be a DC power source (such as 12 volt or 42 volt supplies found in vehicles). External power 110 goes to power supply 112 for any necessary inversion to AC, conversion to DC, etc. For example, in an alternative embodiment in which the circuitry of base transceiver unit 104 operates at 5 volts DC, power supply 112 may convert from 240 VAC to 5 VDC. External power 110 may also be used to recharge battery 114, or in alternative embodiments, power supply 112 may recharge battery 114 using power supplied by external power source 110. Battery 114 may provide power to both power supply 112 and power control circuit 120. In the embodiment depicted in FIG. 3, battery 114 receives current from charging circuit 116, which receives power from inductive coil 118. Inductive coil 118 is used to supply energy to the base transceiver unit, without any need for any "charging stand" into which base transceiver unit 104 must be placed. In other embodiments of the invention (not pictured), charging circuit 116 may be supplied directly by power supply 112 or even directly be external power 110 if the voltage of battery 114 matches the voltage of external power 110, (as might occur with a 12 volt battery pack used in a vehicle having a 12 volt DC electrical supply).

Charging of base transceiver unit 104 may be accomplished by placing the unit near to a "charging tray" (not shown) or "charging tower" or other similar device which transmits electrical energy to inductive coil 118. Such charging may occur during use, for example when base transceiver unit 104 is in use in operative proximity to the charging tray, or during the night, etc. Thus base transceiver unit 104 need never be "plugged into" a "charging stand."

Power control circuit 120 assists in saving energy by controlling the power flow to transmitter 122, receiver 124, power supply 112, and other associated circuitry. Power control circuitry 120 thus saves energy and furthermore increases battery life. Power control circuit 120 may operate automatically to turn on and off transmitter 122 or power supply 112, and may operate to turn on and off or to mute receiver 124.

For example, a user might use the headset of the present invention to carry on a long telephone conversation, thus somewhat draining the battery of the headset unit (not shown). During the course of the conversation, power control circuit 120 may provide automatic volume control as both a convenience and an energy saving mechanism. The user may provide manual volume control by adjusting the volume of the base device. At the conclusion of the telephone conversation, power control circuit 120 may entirely turn off receiver 124 and transmitter 122, thus reducing the trickle current usage of the charging tray, and receive energy via charging circuit 116 and inductive coil 118. Later, control circuit 120 may turn off power supply 112, thus further decreasing energy use by eliminating the "trickle current". Note that in an alternative embodiment of the invention, this energy saving scheme may be used only at the first level (to turn off the transmitter and receiver units) but not at the second level, to turn off the charging current, or may be used in the opposite manner: turning off the charging current but not the transmitter and receiver units.

The time of turning off of the power supply may be dictated by the charging of the base transceiver battery (not shown), may be automatic based upon time or other factors, may be manual, etc.

The presently preferred embodiment and best mode now contemplated for carrying out the invention the embodiment in which the base transceiver unit is inductively charged by a charging tray, as is the headset transceiver unit. In alternative embodiments, the charging function may be built into the base transceiver unit, and the headset charged inductively at the base transceiver rather than the charging tray.

Figure 4:
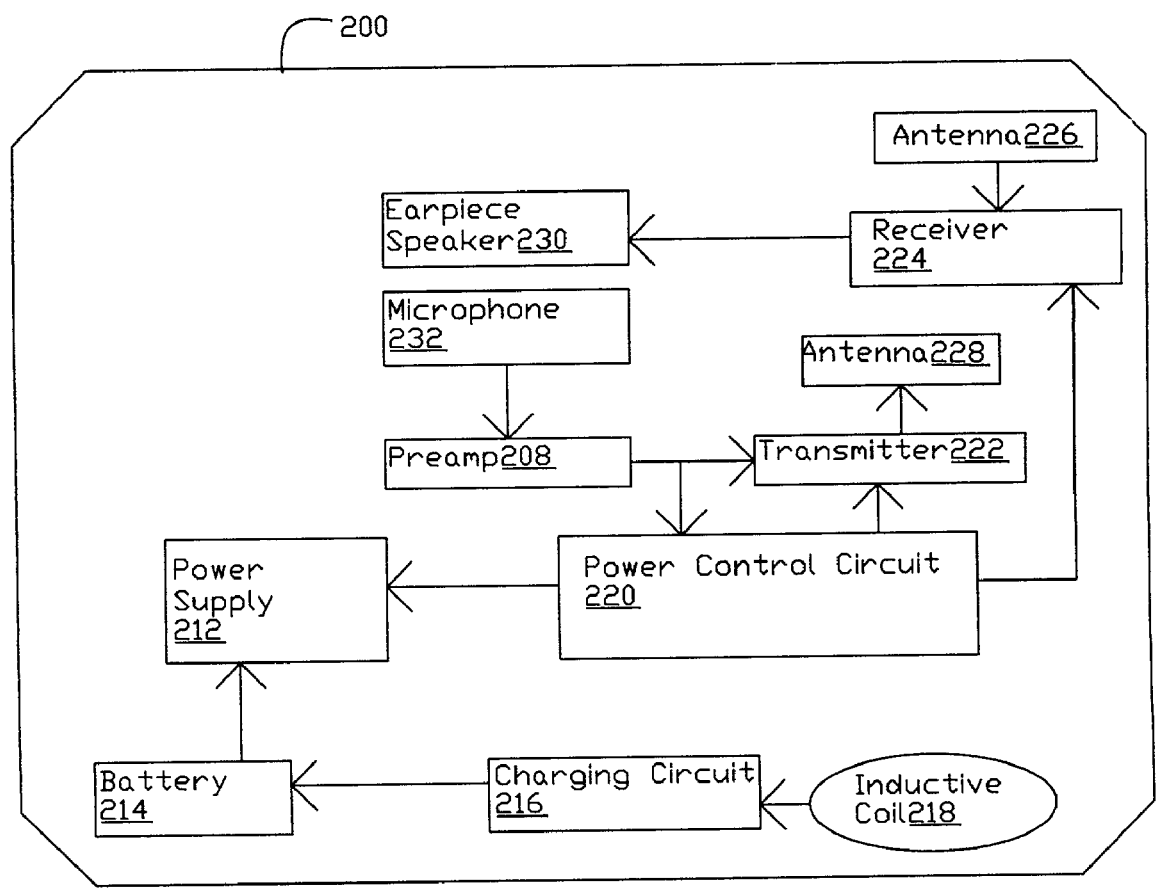
FIG. 4 is a block diagram of the first embodiment of the invention showing details of the headset transceiver unit.

FIG. 4 is a block diagram of the first embodiment of the invention showing details of the headset transceiver unit.

Headset 200 has preamp 208, microphone 232, transmitter 222, earpiece speaker 230, receiver 224 and antennae 226 and 228. These function in a manner analogous to that described above in reference to base transceiver unit 104. Microphone 232 picks up audio signals from the user, converts such audio data to electronic information and transmitter 222 sends the signals to base transceiver unit 104 as radio frequency emissions. Receiver 224 picks up RF emissions from base transceiver unit 104 and sends them to earpiece speaker 230 for conversion to audible format (sound waves) for the user. Antennae 224 and 226 are shown in FIG. 4, however, the two may be combined in alternative embodiments into a single antenna device.

In the presently preferred embodiment and best mode presently contemplated for carrying out the invention, antennae 226 and 228 may be hidden within microphone tube 18 (see FIG. 1). By this method the overall size of headset 200 may be kept small. Antennae 226 and/or 228 may also be located on microphone tube 18. In any case, antenna 226 and 228 may run along a portion or all of the length of microphone tube 18.

Size, weight and cost being important issues in headset design, it is desirable to eliminate as much structure as possible without eliminating the associated functionality. In headset 200, power supply 212 is powered by battery 214 without need for physical connection to any external power source. This is enabled by inductive coil 218 in which a current is induced by inductive coil 118 (the coil in the base transceiver unit). Coil 218 is controlled by charging circuit 216 which supplied electricity to recharge battery 214. Thus, it is possible for the headset of the present invention to do away entirely with recharging plugs, sockets, contacts, and other physical structure/devices for contact recharging, thus saving weight, space and cost. In addition, users are not required to "plug into" a special charging stand. Depending upon range of the inductance, the user may recharge the headset merely by placing it on or near the recharging tray. With long range and close proximity, it may even be possible for the headset to recharge while being worn.

In order to provide the most efficient battery life possible, and to further reduce weight, size and cost, power control circuit 220 is also provided in headset 200. Power control circuit 220 eliminates the need for a headset mounted volume control, a headset mounted on/off switch and other devices.

During use, power control circuit 220 and/or receiver 224 may act to automatically control volume of the audio output from earpiece speaker 230. Power control circuit 220 and/or transmitter 222 may also act to control transmission strength to base transceiver unit 104. By means of this structure, battery life and sound quality may be enhanced, but without the cost and bulk of an external control device such as a knob large enough for manipulation by a user's fingers.

When the user desires manual volume control, the user may accomplish this by adjusting the volume of the base device (such as a cell phone) to which the base transceiver is attached.

Furthermore, power control circuit 220 may turn on and off receiver 224 and transmitter 222 in a manner similar to that described above in reference to base transceiver unit 104. By this means, battery life may be extended yet without the cost and bulk of an external control device such as a switch of a size suitable for a user's fingers to operate.

Power control 220 may act independently of base unit power control 120 or may cooperate with base unit power control 120. For example, power control 220 may act to shut down transmitter 222 whenever a user silence is detected, or power control 220 may receive a signal from base unit 104 informing it of the end of a transmission or of the end of a user session such as a single telephone call.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A wireless headset system comprising:
   a wireless headset including a clip dimensioned and configured to hold said wireless headset properly oriented near the ear and mouth of a user, a microphone operatively connected to a headset transmitter, a speaker operatively connected to a headset receiver, a headset rechargeable battery; and a headset inductive coil operatively connected to said headset battery;
   a base transceiver including an interface for physically connecting to a stand-alone communications device, a base transmitter for sending signals to said headset receiver, a base receiver for receiving said signals from said headset transmitter, a base rechargeable battery; and a base inductive coil operatively connected to said base battery; and
   wherein said base transceiver and said wireless headset are adapted to send and receive signals enabling said user to communicate over said communications device.

2. The wireless system of claim 1, wherein said wireless headset further includes a power control device capable of controlling current flow to at least one member of the group comprising said headset transmitter, said headset receiver, said headset speaker, said headset microphone, and combinations thereof.

3. The wireless system of claim 1 wherein said power control device has no manual controls.

4. The wireless system of claim 1, wherein said wireless headset further includes a body portion within which the transmitter and receiver are contained.

5. The wireless system of claim 1, wherein said wireless headset and said base transceiver use radio frequency signals in the range from 100 MHz to 2.4 GHZ.

6. The wireless system of claim 1, wherein said wireless headset further includes a microphone tube and an antenna contained within said microphone tube.

7. The wireless system of claim 1, wherein said wireless headset further includes microphone tube and an antenna running along microphone tube.

8. The wireless system of claim 1, wherein said base transceiver includes at least one antenna.

9. The wireless system of claim 1, wherein said base transceiver further includes a plug and power reception circuitry configured to receive electrical energy from an electrical outlet.

10. The wireless system of claim 1, wherein said base transceiver further includes digital encoding/decoding circuitry.

11. The wireless system of claim 1, wherein said base transceiver and said wireless headset provide half duplex data transmission.

12. The wireless system of claim 1, wherein said base transceiver and said wireless headset provide full duplex data transmission.

13. The wireless system of claim 1, wherein said headset inductive coil and said base unit inductive coil may be recharged when placed in proximity to a charging tower.

14. The wireless system of claim 1, wherein said headset inductive coil and said base unit inductive coil may be simultaneously recharged when placed in proximity to a charging tower.

* * * * *